Sept. 13, 1966  A. P. DESMAZES ET AL  3,271,946
ACCELERATING ARRANGEMENT FOR GAS-TURBINE JET ENGINES
Filed April 16, 1964  2 Sheets-Sheet 1
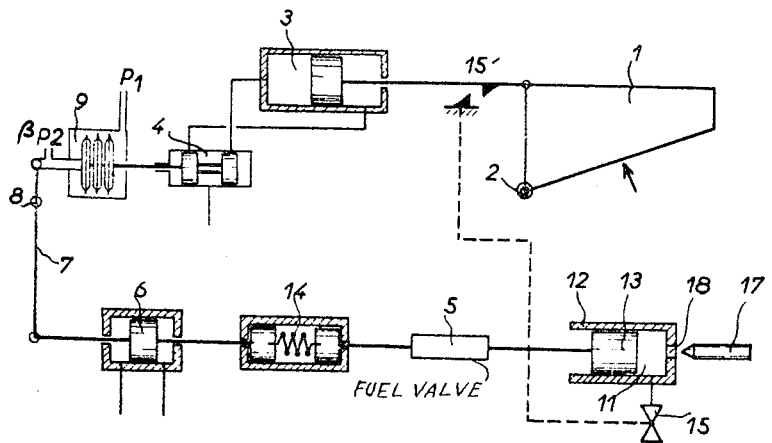
Fig.: 1
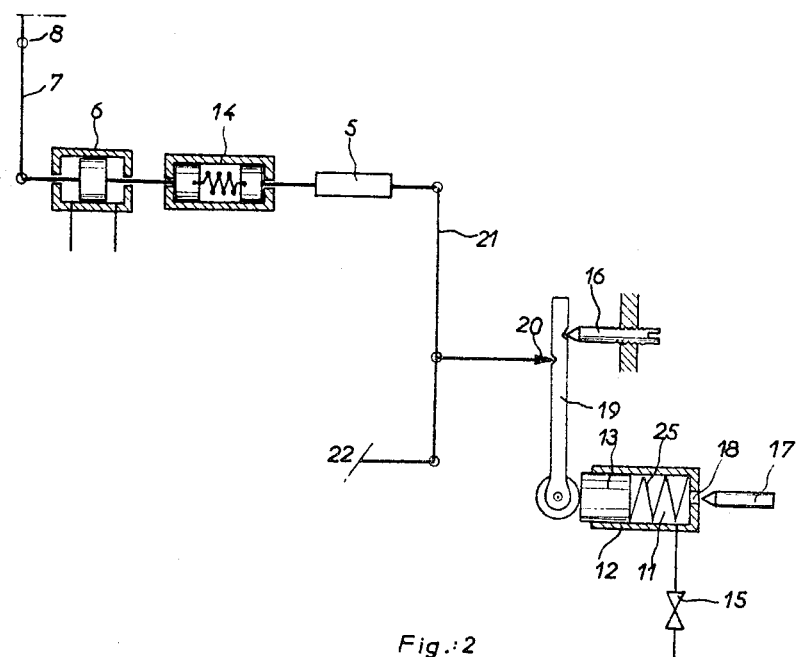
Fig.: 2
Inventors
Andre Pierre Desmazes
Roger Henri Tissier
By Stevens Davis Miller & Mosher
Attorneys

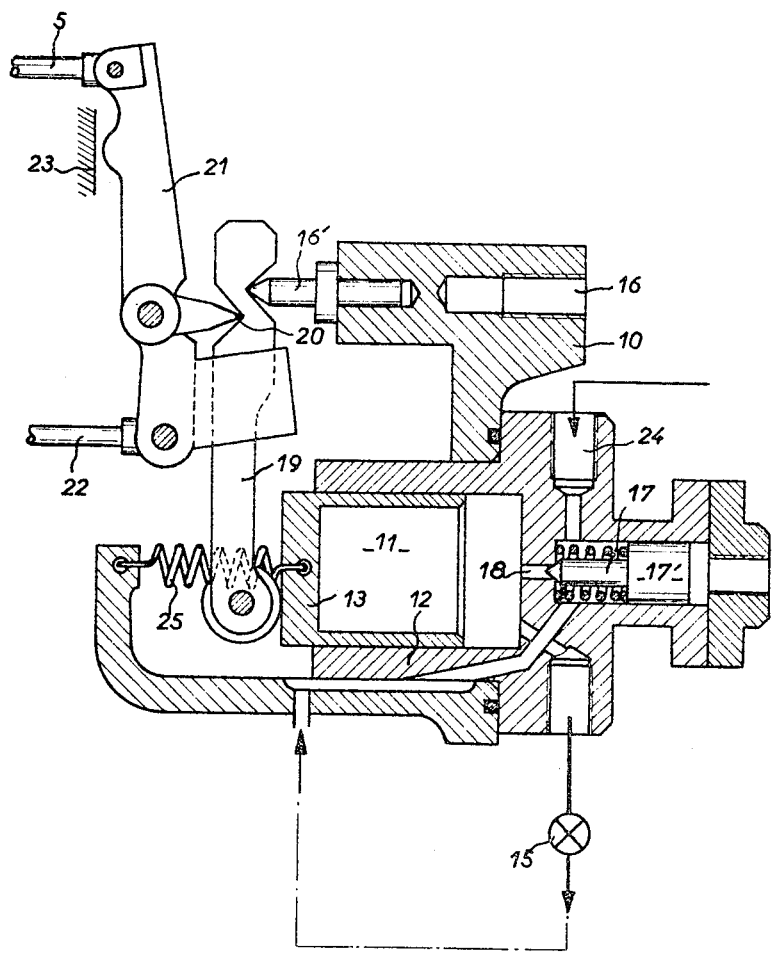
Fig.: 3

United States Patent Office 3,271,946
Patented Sept. 13, 1966

3,271,946
ACCELERATING ARRANGEMENT FOR
GAS-TURBINE JET ENGINES
Andre Pierre Desmazes, Saint-Maur, and Roger Henri Tissier, Paris, France, assignors to Societe Nationale d'Etude et de Construction de Moteurs d'Aviation, Paris, France, a company of France
Filed Apr. 16, 1964, Ser. No. 360,318
Claims priority, application France, Apr. 26, 1963, 932,876
11 Claims. (Cl. 60—35.6)

The invention relates to an improved accelerating arrangement for gas-turbine engines, particularly aircraft turbojet and turboprop engines.

In a gas-turbine engine having a propulsion nozzle of constant area, in order to increase the rotational speed it is necessary to increase instantaneously the controlled quantity of fuel; this increase in fuel immediately increases the compression ratio of the compressor, and thus the pressure downstream thereof, and the surplus fuel injected is liable to cause the compressor to stall. For this reason it is necessary to operate "steadily" with performances substantially lower than the limit which would otherwise be possible, in order to retain a sufficient margin to permit trouble-free acceleration.

It is an object of the present invention to provide an accelerating arrangement which will enable the necessity of operating in such a way to be avoided and, to this end the invention is applied to engines having a propulsion nozzle of variable area. Inter alia, it permits the rotational speed to be increased without the necessity of supplying supplementary fuel and it also permits operation very close to the safety limit.

It is known for such engines to comprise, on the one hand, a speed governor which detects the rotational speed of the engine and compares it with the rotational speed selected by the throttle lever (the difference detected giving the necessary corrective order to the servo-jack of the fuel metering device) and, on the other hand, a temperature regulator which keeps the temperature in the combustion chamber constant by varying the area of the propulsion nozzle in accordance with the difference in pressure $\beta p_2 - p_1$, that is to say the difference between, on the one hand, the pressure $\beta p_2$ which is produced in a pressure reducer from the delivery pressure $p_2$ of the compressor and which is transmitted to the interior of pressure-sensitive capsules and, on the other hand, the pressure $p_1$ at which admission to the compressor takes place and which is transmitted to the exterior of these capsules. The difference elongating movement of the capsules is transmitted to a distributor acting on the jacks controlling the nozzle-area varying means. Thus, the shifting of the rod of the distributor controlling the nozzle jacks is effected under the joint action of the displacement of the metering device and of the elongation of the capsules.

According to the invention, in such a system acceleration takes place in two stages:

(1) Establishment of the new rotational speed by opening of the propulsion nozzle without any fuel being supplied and, consequently, without any risk of stalling;

(2) Establishment of the new thrust by gradual closing of the propulsion nozzle, concomitant with a gradual supply of fuel which is, moreover, linked to the position of the nozzle.

To this end, the arrangement according to the invention comprises a yieldable connecting device having an operative threshold and acting in co-operation with releasable stop means which, when operative, opposes any movement of the metering device on the initiation of an acceleration order. The metering device may be connected at one side thereof to its associated servo-jack through the medium of the yieldable connection device which is compressible during opening of the metering device. At the other side thereof the metering device may be connected to the stop means, which is rendered operative when the pilot gives an acceleration order to the servo-jack of the metering device. The stop means may be hydraulic, that is to say it may include a piston and a cylinder, the chamber of which is constantly filled with a liquid and the outlet of which can be closed by a closure member under the control of the pilot. When this closure member is open, which corresponds to the release of the stop means, the metering device moves freely under the action of its servo-jack in correlation with the means acting on the nozzle area, but when the pilot gives an acceleration order:

(a) The closure member closes and the piston is locked, which corresponds to the putting into action of the stop means, the metering device being thus fixed in position and any additional supply of fuel being prevented;

(b) The servo-jack moves but, as the metering device is locked, it is the yieldable connecting device which gives way and is compressed. On the other hand, the servo-jack acts on the distributor of the nozzle jacks. The nozzle is therefore temporarily acted on independently of the metering device and this achieve the first stage provided for above.

The second stage is achieved owing to the fact that the closure member is gradually released, either by the pilot when he deems this necessary or by an automatic mechanism operating with delay. The metering device is thus freed little by little and, as the yielding device expands or contracts, it brings the metering device to the position corresponding to the desired rotational speed.

It will be seen that at no time has an excess quantity of fuel being injected, such as might subject the engine to dangerous conditions due, for example, to surging of the compressor.

The description which follows with reference to the accompanying drawings, which is given by way of non-limitative example only, will make it clearly understood how the invention can be carried into effect. In the drawings:

FIGURE 1 is a purely diagrammatic view of one form of arrangement according to the present invention applied to a known regulation system;

FIGURE 2 is a similar view of part of a modified arrangement and

FIGURE 3 is a sectional view of a detail of the arrangement shown in FIGURE 2, drawn to a larger scale.

Referring to the drawings, FIGURE 1 shows diagrammatically a conventional variable area propulsion nozzle element of a gas-turbine jet engine. In this arrangement a flap 1 is pivotable about a transverse axis 2 and is controlled by a hydraulic jack 3. A liquid distributor 4 associated with the jack 3 is controlled by a servo-jack 6 associated with a fuel metering device 5, through the intermediary of a lever 7 pivoted at 8 and acting on a pressure sensing device 9 which is indirectly responsive to the temperature of the gases in the combustion chamber of the jet engine.

This known arrangement for regulating the supply of fuel and the nozzle area is supplemented, according to the present invention, on the one hand by a yieldable device 14 having an operative threshold interposed in the connection between the piston of the servo-jack 6 and the metering device 5 and, on the other hand, by a piston 13 coupled to the metering device 5 and sliding in a cylinder 12 in which it defines a chamber 11. The latter receives a liquid which escapes therefrom through an orifice 18 which is normally open but can be closed by a member 17; there is also a normaly closed cock 15 which permits the chamber to be emptied.

The arrangement which has just been described operates in the following manner:

An acceleration order given to the servo-jack 6 is acompanied by the closing of the closure member 17 and, consequently, by the locking of the metering device 5. The movement of the piston rod of the servo-jack 6 towards the right in response to the acceleration order is taken up, so far as concerns the side of the jack where the metering device 5 is located, by simple compression of the yieldable connection 14, but on the other side of the jack 6 it is transmitted by the lever 7 to the distributor 4 of the jack 3, thus opening the flap 1. Immediately the closure member 17 begins to open, gradually releasing the metering device 5, the yieldable connection 14 expands and brings the metering device to the position corresponding to the desired r.p.m.

It will be obvious that the locking of the metering device could be achieved just as well by electrical, mechanical, pneumatic or other means.

In the case where the nozzle is already completely open before the acceleration order is given, the opening thereof obviously cannot be increased; acceleration can then be effected only by adjustment of the supply of fuel and the locking device must therefore be rendered inoperative, this being effected by opening the drain cock 15 connected to the chamber 11. This operation may be effected automatically, for example by means of a device (indicated diagrammatically at 15') which is operable in response to the nozzle jacks reaching the end of their stroke.

The modified arrangement of FIGURE 2 includes a device alowing manual adjustment by means of a screw 16 acting on a lever 19 which forms part of the kinematic connection between the piston 13 and the metering device 5, the piston 13 and the metering device 5 being off-set relatively to one another. A rocking lever 21 permits of making the system dependent at 22, on some further condition, such as limitation due to the known double stop of an ordinary regulating system. During operation in the unlocked state, the rod of the metering device can move and act on the system including the lever 21, which thus actuates the lever 19, by way of an intermediate member acting at 20. Moreover, the piston 13 is urged by a spring 25 against a roller carried by the lever 19. Thus contact of the lever 19 with the member 16 and at 20 is ensured and the lever 19 turns about the fixed point constituted by the end of the member 16 and follows the movements of the end of the member 20, with corresponding movement of the piston 13. FIGURE 3 shows how such an arrangement can be adapted for practical use. In FIGURE 3:

The rocking lever 21 is connected on the one hand to the metering device 5 and on the other hand to a controllable abutment 22.

The cylinder 12 and its associated parts are mounted in a block 10 which can be shifted in the direction of the axis of the cylinder by means of a threaded rod 16 which is fixed against longitudinal movement but is rotatable so that it can be screwed to a greater or lesser depth into the internal thread in the block 10.

This shifting permits the adjustment of the level of the "maximum" stop of the usual double stop device. The "minimum" stop 23 of the latter is fixed, as is customary.

Incompressible fluid (oil) arrives continually at 24; the closure member 17 is in the form of a needle valve which is normally held in the open position by a spring and is integral with a plunger 17' on the free face of which a pressure can be exerted under the control of a valve (not shown) which is itself controlled by the pilot's throttle lever. In normal regulation the spring 25 ensures that the piston 13 follows the movements of the lever 19 as the latter pivots about the fixed point constituted by the bottom of the notch where the point 16' abuts, the position of this point being previously adjusted. Pivoting of the lever 19 takes place under the influence of the movements of the metering device 5 and of the controllable abutment 22. Connection between the two levers 19 and 21 is effected by a knife edge carried by the lever 21 and in contact with the bottom of a notch 20 in the lever 19. The stop representing "maximum" is defined by the position of this point when the piston 13 is at the bottom or end of the cylinder. When a signal is given to accelerate, this acts by closing the chamber 11 at 18, so as to produce a hydraulic stop by locking the piston 13 in the corresponding position.

The metering device 5 is thus prevented from being opened by the double-stop lever 21 being held rigid between the temporarily fixed point of the controllable abutment 22 and the stop of the knife edge bearing in the notch 20.

When the effect on the nozzle is attained or even slightly before, the pressure on the plunger 17' is relaxed and this opens the chamber 11. The piston 13 can then move; the levers are no longer held rigid and the metering device can operate.

To sum up, the arrangement described above provides the following advantages:

It eliminates the risks of stalling on acceleration or on ignition of the after-burning device, by abolishing instantaneous increase in the supply of fuel in these conditions;

It makes it possible to operate close to the surging limit of the compressor and in this way to utilize the maximum possibilities of the machine;

It enables all the movements of the throttle to be made without any risk of the compressor stalling;

It eliminates the problem of the adjustment of the limits of the supply of fuel under acceleration conditions, this limit being automatically adjusted to the "steady-condition" rate of fuel-supply. If, however, the acceleration stop is retained (in the case where operation starts with the propulsion nozzle wide open), the precision of adjustment of this stop is unnecessary and the tolerances of adjustment may be considerably extended;

It eliminates the necessity of providing devices for varying the limiting fuel-supplies upon acceleration.

Since the acceleration stop is used only in the case of an open propulsion nozzle and, consequently, under conditions which do not give rise to the risk of stalling, it is possible to give it a simple form allowing very wide limits.

If necessity imposes the obligation of modulating the level of "steady-condition" operation under the effect of varying conditions of, for example, temperature, aircraft-speed or altitude, it will always be easier and less dangerous to do so at a level of "steady-condition" operation which will always be below the critical point than to do so with an acceleration stop which will represent the danger limit. Dispersions, which are inevitable when the modulation of a stabilized level is adjusted, will have less serious consequences than dispersions on the stop level, which really represents the limit.

What is claimed is:

1. In a gas-turbine jet engine having a propulsion nozzle, nozzle area varying means, first fluid-operated jack means for controlling the nozzle area varying means, a device for the metered supply of fuel, second jack means controlling opening and closing of said fuel supply device, control means actuable to initiate operation of said second jack means to open said fuel supply device and thus to cause acceleration, and a fluid distributor controlling the supply of operating fluid to said first jack means in response to operation of said fuel supply device, an accelerating arrangement comprising a yieldable connecting device between said fuel supply device and said second jack means in the direction to open said fuel supply device, and releasable stop means operable upon actuation of said control means, to prevent opening of said fuel supply device and thus to cause said yieldable connecting device to be compressed during the time when said nozzle area varying means is being operated to open said nozzle, said stop means being releasable when said propulsion nozzle has been opened, thereby allowing opening of said fuel supply device under the action of expansion of said yieldable device.

2. An arrangement according to claim 1, wherein said stop means is hydraulically operated.

3. An arrangement according to claim 1, wherein said stop means comprises a cylinder having a piston therein and a fluid discharge orifice, and a closure member for said fluid discharge orifice, movable to close said orifice so as to prevent relative movement of said cylinder and piston, thereby rendering said stop means operative to prevent operation of said fuel supply device, and to open said orifice to allow relative movement of said cylinder and piston, thereby releasing said stop means to allow operation of said fuel supply device.

4. An arrangement according to claim 3, including spring means biasing said closure member into open position and a plunger connected to said closure member and displaceable to close said closure member upon application of pressure to said plunger when said control means is actuated.

5. An arrangement according to claim 3, wherein said second jack means, said yieldable connecting device, said fuel supply device and said cylinder are arranged coaxially.

6. An arrangement according to claim 3, wherein said fuel supply device and said cylinder are off-set transversely relatively to one another, a lever connection being provided between them.

7. An arrangement according to claim 1, including a detector responsive to operation of said nozzle area varying means fully opening said propulsion nozzle, to release said drop means.

8. An arrangement according to claim 3, including a drain cock for said cylinder and a detector responsive to operation of said nozzle area varying means fully opening said propulsion nozzle, to open said drain cock and thereby to release said stop means.

9. An arrangement according to claim 3, including a supporting block for said cylinder, said piston and said closure member, said block being mounted for adjusting movement in the direction of the cylinder-axis.

10. An arrangement according to claim 3, including a supporting block for said cylinder, said piston and said closure member, said block being mounted for adjusting movement in the direction of the cylinder-axis, and screw means being provided to effect adjusting movement of said block.

11. A gas-turbine engine including a propulsion nozzle, nozzle area varying means, first fluid-operated jack means for controlling the nozzle area varying means, a device for the metered supply of fuel, second jack means controlling opening and closing of said fuel supply device, control means actuable to initiate operation of said second jack means to open said fuel supply device and thus to cause acceleration, a fluid distributor controlling the supply of operating fluid to said first jack means in response to operation of said fuel supply device, and an accelerating arrangement comprising a yieldable connecting device between said fuel supply device and said second jack means and compressible during operation of said second jack means in the direction to open said fuel supply device, and releasable stop means operable upon actuation of said control means, to prevent opening of said fuel supply device and thus to cause said yieldable connecting device to be compressed during the time when said nozzle area varying means is being operated to open said propulsion nozzle, said stop means being releasable when said propulsion nozzle has been opened, thereby allowing opening of said fuel supply device under the action of expansion of said yieldable device.

References Cited by the Examiner

UNITED STATES PATENTS 2,706,383  4/1955  Jacobson _____ 60—35.6

JULIUS E. WEST, *Primary Examiner.*